US008500554B2

(12) United States Patent
Brandstetter et al.

(10) Patent No.: US 8,500,554 B2
(45) Date of Patent: *Aug. 6, 2013

(54) GAMING DEVICE HAVING A SECOND SEPARATE BONUSING EVENT

(75) Inventors: Steve Brandstetter, Merrick, NY (US); James Devlin, East Meadow, NY (US)

(73) Assignee: MGT Gaming, Inc., Harrison, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/569,837

(22) Filed: Aug. 8, 2012

(65) Prior Publication Data

US 2012/0302316 A1 Nov. 29, 2012

Related U.S. Application Data

(63) Continuation of application No. 12/930,712, filed on Jan. 14, 2011, now abandoned, which is a continuation of application No. 09/982,437, filed on Oct. 18, 2001, now Pat. No. 7,892,088.

(51) Int. Cl.
*A63F 9/24* (2006.01)
*A63F 13/00* (2006.01)

(52) U.S. Cl.
USPC .................. 463/31; 463/16; 463/25; 463/30; 463/40; 463/42

(58) Field of Classification Search
USPC ...................................................... 463/20, 31
See application file for complete search history.

(56) References Cited

U.S. PATENT DOCUMENTS

| | | | | | |
|---|---|---|---|---|---|
| 4,710,873 | A | * | 12/1987 | Breslow et al. | 463/31 |
| 4,837,728 | A | * | 6/1989 | Barrie et al. | 463/27 |
| 5,280,909 | A | * | 1/1994 | Tracy | 463/27 |
| 5,393,057 | A | * | 2/1995 | Marnell, II | 463/13 |
| 5,397,133 | A | * | 3/1995 | Penzias | 463/22 |
| 5,572,248 | A | * | 11/1996 | Allen et al. | 348/14.1 |
| 5,580,309 | A | * | 12/1996 | Piechowiak et al. | 463/16 |
| 5,595,389 | A | * | 1/1997 | Parulski et al. | 463/31 |
| 5,772,509 | A | * | 6/1998 | Weiss | 463/16 |
| 5,924,927 | A | * | 7/1999 | Matsuura et al. | 463/62 |
| 6,012,982 | A | * | 1/2000 | Piechowiak et al. | 463/16 |
| 6,077,162 | A | * | 6/2000 | Weiss | 463/26 |
| 6,110,043 | A | * | 8/2000 | Olsen | 463/27 |
| 6,146,273 | A | * | 11/2000 | Olsen | 463/27 |
| 6,168,523 | B1 | * | 1/2001 | Piechowiak et al. | 463/26 |
| 6,217,448 | B1 | * | 4/2001 | Olsen | 463/25 |
| 6,309,299 | B1 | * | 10/2001 | Weiss | 463/20 |
| 6,315,660 | B1 | * | 11/2001 | DeMar et al. | 463/16 |
| 6,319,125 | B1 | * | 11/2001 | Acres | 463/25 |
| 6,364,314 | B1 | * | 4/2002 | Canterbury | 273/274 |
| 6,375,567 | B1 | * | 4/2002 | Acres | 463/25 |
| 6,398,218 | B1 | * | 6/2002 | Vancura | 273/138.1 |
| 6,786,824 | B2 | * | 9/2004 | Cannon | 463/42 |
| 6,800,026 | B2 | * | 10/2004 | Cannon | 463/16 |
| 6,869,361 | B2 | * | 3/2005 | Sharpless et al. | 463/25 |
| 6,984,173 | B1 | * | 1/2006 | Piechowiak et al. | 463/20 |
| 7,008,324 | B1 | * | 3/2006 | Johnson et al. | 463/42 |
| 7,311,598 | B2 | * | 12/2007 | Kaminkow et al. | 463/16 |
| 7,976,389 | B2 | * | 7/2011 | Cannon et al. | 463/42 |
| 8,272,945 | B2 | * | 9/2012 | Kelly et al. | 463/25 |
| 2001/0004607 | A1 | * | 6/2001 | Olsen | 463/26 |

(Continued)

*Primary Examiner* — Steven J Hylinski
(74) *Attorney, Agent, or Firm* — Parks IP Law LLC; Theodore A. Wood, Esq.

(57) ABSTRACT

A gaming system wherein a second game is triggered once a specific event occurs in a first game.

24 Claims, 4 Drawing Sheets

U.S. PATENT DOCUMENTS

| | | | | |
|---|---|---|---|---|
| 2002/0039923 | A1 * | 4/2002 | Cannon et al. | 463/42 |
| 2002/0177483 | A1 * | 11/2002 | Cannon | 463/42 |
| 2002/0183105 | A1 * | 12/2002 | Cannon et al. | 463/16 |
| 2003/0114218 | A1 * | 6/2003 | McClintic | 463/25 |
| 2004/0097286 | A1 * | 5/2004 | Vancura | 463/26 |
| 2005/0026679 | A1 * | 2/2005 | Lucchesi et al. | 463/20 |

* cited by examiner

GAMING DEVICE HAVING A SECOND SEPARATE BONUSING EVENT

CROSS REFERENCE TO RELATED APPLICATIONS

This application is a continuation of U.S. patent application Ser. No. 12/930,712, filed Jan. 14, 2011, which is a continuation of U.S. patent application Ser. No. 09/982,437, filed Oct. 18, 2001, which are incorporated herein by reference in their entirety.

FIELD OF THE INVENTION

A gaming system wherein a second game is triggered once a specific event occurs in a first game.

BACKGROUND OF THE INVENTION

U.S. Pat. No. 5,752,882 relates to a method and apparatus for operating networked gaming devices. The system can support a file server, one or more floor controllers, one or more pit terminals, and other terminals all interconnected over the network. Each gaming device includes an electronic module which allows the gaming device to communicate with a floor controller over a current loop network. The electronic module includes a player tracking module and a data communication node. The player tracking module includes a card reader for detecting a player tracking card inserted therein which identifies the player. The data communication node communicates with both the floor controller and the gaming device. The data communication node communicates with the gaming device over a serial interface through which the data communication node transmits reconfiguration commands. The gaming device reconfigures its payout schedule responsive to the reconfiguration commands to provide a variety of promotional bonuses such as multiple jackpot bonuses, mystery jackpot bonuses, progressive jackpot bonuses, or player specific bonuses.

U.S. Pat. No. 5,876,284 relates to a method and apparatus for implementing a jackpot bonus on a network of gaming devices. Each gaming device includes a data communication node which allows the gaming device to communicate with a floor controller over a current loop network. The data communication network communicates with both the floor controller and the gaming device. In a multiple jackpot time bonus, the system activates a storm simulator which provides simulated lightning and thunder that vary in intensity with the value of a jackpot multiplier during a bonus period. The bonus jackpots are paid to players at the gaming device.

U.S. Pat. No. 6,234,897 relates to a gaming device with variable bonus payout feature. A slot machine comprises a spinning reel display and a bonus game. The spinning reel display shows a plurality of symbols on each of a plurality of rotatable reels. The reels are rotated and stopped to place the symbols of each reel in visual association with a pay line. The pay line is associated with at least one of the symbols on each of the reels. The bonus game is triggered in response to start-bonus symbols from the respective stopped reels appearing in the spinning reel display. The bonus game having different expected values based on different arrangements of the start-bonus symbols in the spinning reel display. This patent discloses an embodiment wherein the base game is a reel-type slot machine and the bonus game is a simulated reel-type slot machine implemented on a video-type display. In the bonus game, the probability of winning combinations appearing on the reels, or the hit rate is much greater than that of the base game. The player is permitted to keep playing and accumulate winnings from the bonus game until a losing trial occurs. The base game and the bonus game may be the same game system with different pay tables and rules. The base game and the bonus game may be executed on the reels of a spinning reel slot machine where the symbols on the reels are given two different sets of probabilities for the base and bonus games. Another alternative is for the base game to be a spinning reel slot machine coupled with a video poker game as the bonus game. Another embodiment is to use a spinning reel slot machine as the base game and a slot machine simulation on a video display as the bonus game. A further embodiment uses a spinning reel slot machine as the base game and a matching game on a video display as a bonus game. The figures describe the slot machine provided with a video-type display housed in a vertically disposed enclosure secured to the upper portion of the slot machine.

U.S. Pat. No. 6,217,448 relates to a controller-based linked gaming machine bonus system. A method for providing bonus jackpot payoffs during a bonus mode time period in a system of linked gaming machines interconnected to a controller. Eligible gaming machines are determined at the time the bonus time period starts. Once the bonus time period starts, a portion of the eligible gaming machines are randomly selected for multiple jackpot bonus payoff opportunities. Once the gaming machines are selected they are allowed to complete the game they are currently involved in and should play the result in a winning combination, then the game payoff is multiplied by a bonus multiplier. The underlying gaming machine is responsible, in a conventional fashion, for paying the game payoff and the controller then authorizes a further jackpot bonus payoff of the bonus multiplier less one times the game payoff.

U.S. Pat. No. 6,203,429 relates to a gaming machine with bonus mode. A gaming machine is operated by a programmed microprocessor in which the first mode of operation, a basic gambling game, is implemented such as video poker or reel-type slot machine play. If bonus symbols are selected in the basic mode, a bonus mode is triggered. In the bonus mode the same or different game is implemented by the micro-processor system employing a variable probability trial procedure in which the player continues to play and receive awards until a losing combination occurs. The bonus game may be similar to the base game, albeit with different symbol probabilities or it may be a completely separate game on the same or a different display. For example, in one embodiment, a reel spinning slot machine is used for the base game while a dot matrix display simulation of a slot machine or card game is used for the bonus game. In another embodiment, a reel spinning slot machine is used for the base game and a lit game board display in conjunction with a dot matrix display is used for the bonus game. Another embodiment is a video poker game as the base game, and the bonus game being a video slot game, or another poker game with a different pay table. A player must play the base game until they qualify for the bonus game. In one embodiment the bonus game is a trail type board game. When the bonus mode is entered, a random number is selected by a random number generator in the slot machine. This random number is used to select a movement value on the trail type board. The position of the player's token or symbol for the trail game is moved according to the movement value, and an action, such as a payout of coins is performed, depending on the characteristics of the stop position on the trail game. Further random numbers are generated and moves are made along the trail game independently of the base game.

U.S. Pat. No. 6,203,009 relates to a slot-type gaming machine with variable drop zone symbols. The gaming machine includes a playing field traversed by objects, such as balls. The playing field can have plural drop zones which can be selected by the player using deflectors that control where the balls are launched. Detectors indicate scoring positions assumed by the balls. A payline display displays scored events. A symbol selector is included to select symbols which are variably assigned to the scoring positions and displayed on displays. Ball score symbols which can be displayed in the payline display and affect winning or bonus play. Game machine includes traditional slot machine reels which works in conjunction therewith.

U.S. Pat. No. 6,146,273 relates to a progressive jackpot gaming system with secret bonus pool. A method of operating of controller-based progressive gaming system having a plurality of gaming machines wherein each gaming machine generates unit bet information indicative of a number of unit bets supplied to a machine for playing a game. The method comprises the steps of randomly selecting a bonus mode activation value between a high and low limit, providing a current value, providing a base value, incrementing the current value when the gaming machines are played so that the current value is incremented by a fixed amount of each unit bet received by each gaming machine. A bonus mode time period is entered when the incremented current value is equal to or exceeds the bonus value. Eligible machines are locked in and random bonus jackpots are made during the bonus time period. Each bonus award decrements the current value by the amount of each award and the bonus mode time period is ended when the current value is less than or equal to the base value.

An embodiment is disclosed wherein the system interfaces with a standard computer having graphics memory interconnected to a set of drivers which in turn are interconnected with a display. The display is large and can be positioned in the area around the controller of the present invention such as near the island. The computer receives the start signal from the bonus mode start. When this signal is detected, the computer begins to operate. The display is comprised of a plurality of segments. Each segment could be in the shape of a square or rectangle or in the shape of a standard jigsaw puzzle configuration. Each time the computer receives the signal, a new segment on a random basis is tuned over to reveal a portion of a picture. If an eligible player is able to discern what the entire picture is, then the player is entitled to another prize. A further embodiment shows a secret bonus pool system which includes a plurality of games G and the controller. Any number of games could be connected to the bus. Games G can be any conventional game which a player plays according to game rules. A bonus game is provided, displayed and played at each eligible gaming machine. As each eligible player wagers credits on their gaming machine, a prize door is opened on the player's bonus LCD display. A cash amount is revealed behind each door when turned over. When the player opens two prize doors having the same cash award, that cash award is given to the player through automatic credit pay. The gaming machines are conventional gaming machines and the second or bonus game is played at each machine in a separate display located at (i.e., on, in or near) each gaming machine.

U.S. Pat. No. 6,120,378 relates to a multi-line slot machine method. A player makes a wager for each pay line on a slot machine that the player wishes to play. On a first pay line of the slot machine, a first row of symbols is displayed to the player. The player selects none, one or more of the symbols from the first pay line as symbols to be held. The symbols that are held are duplicated from the first pay line into all of the other pay lines on which the player has wagered.

U.S. Pat. Nos. 6,059,289 and 6,033,307 relates to gaming machines with bonusing. A method is set forth for playing a bonus game in a secondary slot machine adjacent a primary slot machine. Adjacent means on-top-of each other, side-by-side to each other, or near each other whether in the same housing or in separate housings. The primary slot machine issues a bonus qualifying signal to the secondary slot machine to start play of a bonus game when a bonus qualifying event occurs. The reels of the bonus game include value symbols, null symbols, and end game symbols. After the random spin, the values of any value symbols displayed on the payline of the secondary slot machine are accumulated into an accumulated winning value. The accumulation of a winning value repeatedly continued until an end of the bonus game occurs.

U.S. Pat. No. 5,560,603 relates to a plurality of slot machines interconnected to an electronic controller which displays a separate race game. Each time a particular predetermined combination of indicia appears in the display of a particular slot machine a signal is generated from the slot machine which advances the racing element through particular predetermined distance. If the player's horse reaches the finish line before a timer display times out, then the slot player wins an additional prize. The players are not racing against each other, but against a clock.

U.S. Pat. Nos. 5,823,874 and 5,848,932 relates to the Wheel of Gold and Wheel of Fortune slot casino games incorporating a single play bonusing feature. A rotating wheel is activated by the player depressing a bonus spin button when certain indicia appears on the reels of then slot game and is used to award bonus payouts in a spin of the wheel. After the bonus spin, play resumes in the underlying gaming machine.

U.S. Pat. No. 6,142,873 relates to a gaming device and method which provides a player with an opportunity of an enhanced output based on a display of a first predetermined value on a first display which subsequently activates a second display controllable to a certain extent by the player. The second display provides the player with an enhanced credit scheme and provides the player with a second option of continuing to attempt to enhance the credit payout or retiring before an event occurs which extinguishes the bonusing feature and the award. For example, in one form, the presence of a special symbol on the primary game allows activation of a reel-type device located in a high visibility area, preferably on top of the conventional machine. This second game allows the reel to spin to a stop indicating a certain value. In a second embodiment, a secondary game is a disk divided into a plurality of sectors which is rotated allowing the player to multiply the amount of credits won on the primary game.

U.S. Pat. No. 5,046,736 relates to imitative opponent gambling games. A gambling game which combines the rudiments of poker with imitative opponents leading to the creation of new video poker games. Opponents are simulated to imitate each action of the other player so that when the player bets, each opponent matches the bet; when the player folds, the opponent folds. The video poker games are played on a game device including a video screen. There are multiple computer opponents with one or more bets. The generality of the imitative-opponent method was tested by a board game using poker. The poker hand affects the movement of a marker around a board. The combined winnings from poker winnings and a second pot determine the winner of the game.

U.S. Pat. No. 6,210,275 relates to a progressive jackpot game with guaranteed winner. The invention can be incorporated either as a bonus game or a stand-alone game in a progressive linked gaming machine environment. The game utilizes a plurality of progressive jackpot pools each associated with a particular game outcome (such as Quiniela, Exacta, Trifecta and Superfecta in the case of a horse race derby game). Each progressive jackpot pool is funded through play at the underlying linked game such as a contribution of each wager or through separate wagers. When the game initiates a plurality of successive game rounds are played. Each successive game round reduces the number of possible game outcomes such as by reducing the number of horses in each successive horse race. With each successive game players have a higher probability of winning. The terminating round is reached in which the last game always results in at least one guaranteed winner through reduction of the possible game outcomes. However, a player (or players) may win in the first or any successive round which would immediately terminate the overall common game. The game is designed so that the player starts each game with a set of tickets wherein each ticket is game outcome. Any type of race icon can be used with the invention.

BRIEF SUMMARY OF THE INVENTION

The present invention relates to gaming systems which are linked to an interactive sign. A player plays the gaming machine and upon a certain operation of the gaming machine is then allowed to play the bonusing event. The bonus award is supplemental to the gaming award. The bonus can be cash, a prize, or some other award. The bonus can be redeemable for services, currency, discounts or other goods of value. The gaming system comprises at least two gaming machines and an interactive sign. The payout from the bonusing event can be paid separately by the casino or be paid by the gaming device.

It is an object of the present invention to shave a system for alerting a player when they are playing on the interactive sign. It is an object of the present invention for the bonus prize to be generated from a percentage of the total coins placed into all games which are linked to the interactive sign.

It is an object of the present invention for the gaming device to have the correct mechanism to allow a player to operate the bonusing event from any of the gaming machines linked to the interactive sign. It is a further object of the present invention for the user of the gaming machine entitled to play a bonusing event to receive a ticket or card from that gaming machine which then allows the user to play the bonusing event on a separate gaming machine. It is an object of the present invention for a user to be chosen for a bonusing event based on the number of coins that were placed in an individual gaming machine or based on the total coins placed in the linked gaming machines. It is an object of the present invention for the bonusing event to occur once a user on a particular gaming machine has won a particular prize amount on that gaming machine. It is an object of the present invention for more than one of the linked gaming machines to enter the bonusing event at the same time. It is an object of the present invention for more than one player playing at the linked gaming machines to compete at the bonusing event. It is an object of the present invention for the gaming devices to include; slot machines, video poker, video keno and video bingo games.

It is an object of the present invention to alert the player either visually or by audio when a player has entered the bonusing event.

It is an object of the present invention to link multiple gaming machines so that a combination of gaming machines has to have a certain number of coins inserted before a bonusing event is played.

It is an object of the present invention for the bonusing event to be a wheel which has various monetary denominations around it. A player playing this bonusing event determines when to stop the wheel. When the wheel is stopped whichever monetary amount is selected is provided to the player.

It is an object of the present invention for the bonusing event to be an LCD Screen where a player plays one on one with a casino dealer on the screen.

It is an object of the present invention for the bonusing event to be a ferris wheel that unloads coins when one of the linked gaming machines triggers the bonusing event.

It is an object of the present invention for the gaming machines to have a video monitor so that when a player reaches the bonusing event the video monitor at that gaming machine can produce a picture of that player on the interactive sign.

DETAILED DESCRIPTION OF THE INVENTION

The present invention relates to gaming systems which are linked to an interactive sign. A player playing the gaming machines of the present invention begins playing with the interactive sign upon the triggering of a bonusing event. Upon winning the bonusing event, the gaming machine pays out a bonus to the player, the bonus being supplemental to the gaming award. The bonus can be a monetary award, a prize, or other awards. In an embodiment, the dispensing unit can deliver the monetary award or a slip of paper or card describing the prize.

In a preferred embodiment, the gaming system comprises a device that alerts the player when a bonusing event is occurring. In an embodiment, the system allows a user to enter the bonusing event based on the number of coins that have been placed in a given gaming machine. Once the triggering event has occurred and a player is playing the bonusing event, the gaming machine resets to zero and the counter begins again before the next bonusing event is triggered.

In one embodiment, the amount of coins necessary to enter the bonusing event can be changed by a remote unit. For example, the gaming machine may require $20.00 worth of coins to enter the bonusing event. A few minutes later, from a wireless control, the gaming machine can require $15.00 worth of coins to enter the bonusing event.

In an embodiment, the bonus prize can be generated from a percentage of the total coins placed into all the participating gaming machines.

In an embodiment, the bonusing jackpot is deducted or tabulated as a fixed percentage or hold from the total dollars wagered specifically on machines that are part of the linked gaming machines.

In an embodiment of the present invention the gaming machines can be slot machines, video poker machines, video bingo games and video keno games.

In an embodiment, the present invention provides a device which visually or by audio alerts the player when they have entered the bonusing event.

The system of the present invention can also be progressively linked to offer large jackpots that can include other casino establishments. In an embodiment, if a ticket is dispensed as the bonus, the ticket dispensed is a debit card for use at the casino, i.e., restaurants or gift shops.

Figure 1:
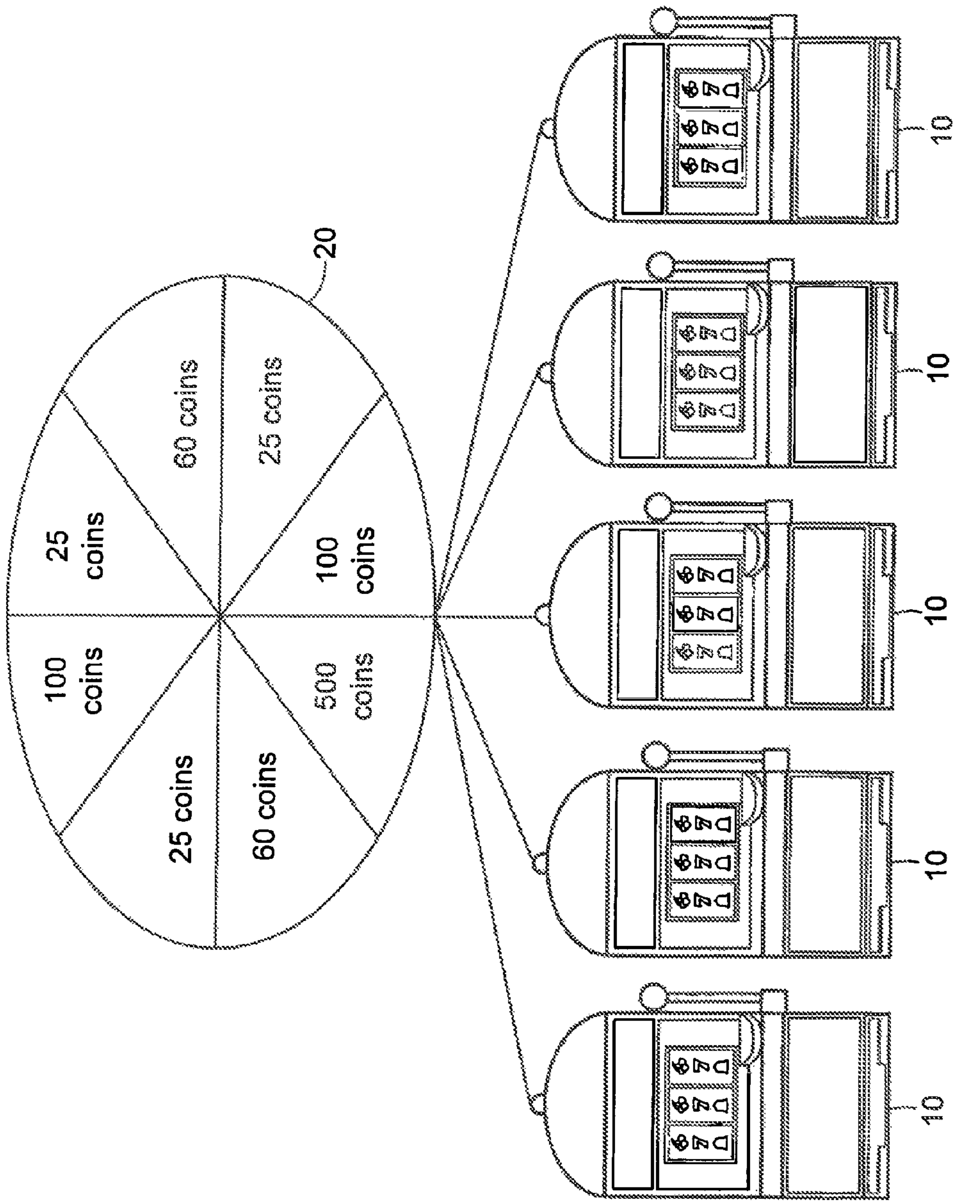
FIG. 1 is an embodiment illustrating a bonusing event of the present invention.

FIG. 1 is an embodiment illustrating linked gaming machines 10 all linked to an interactive sign 20.

Figure 2:
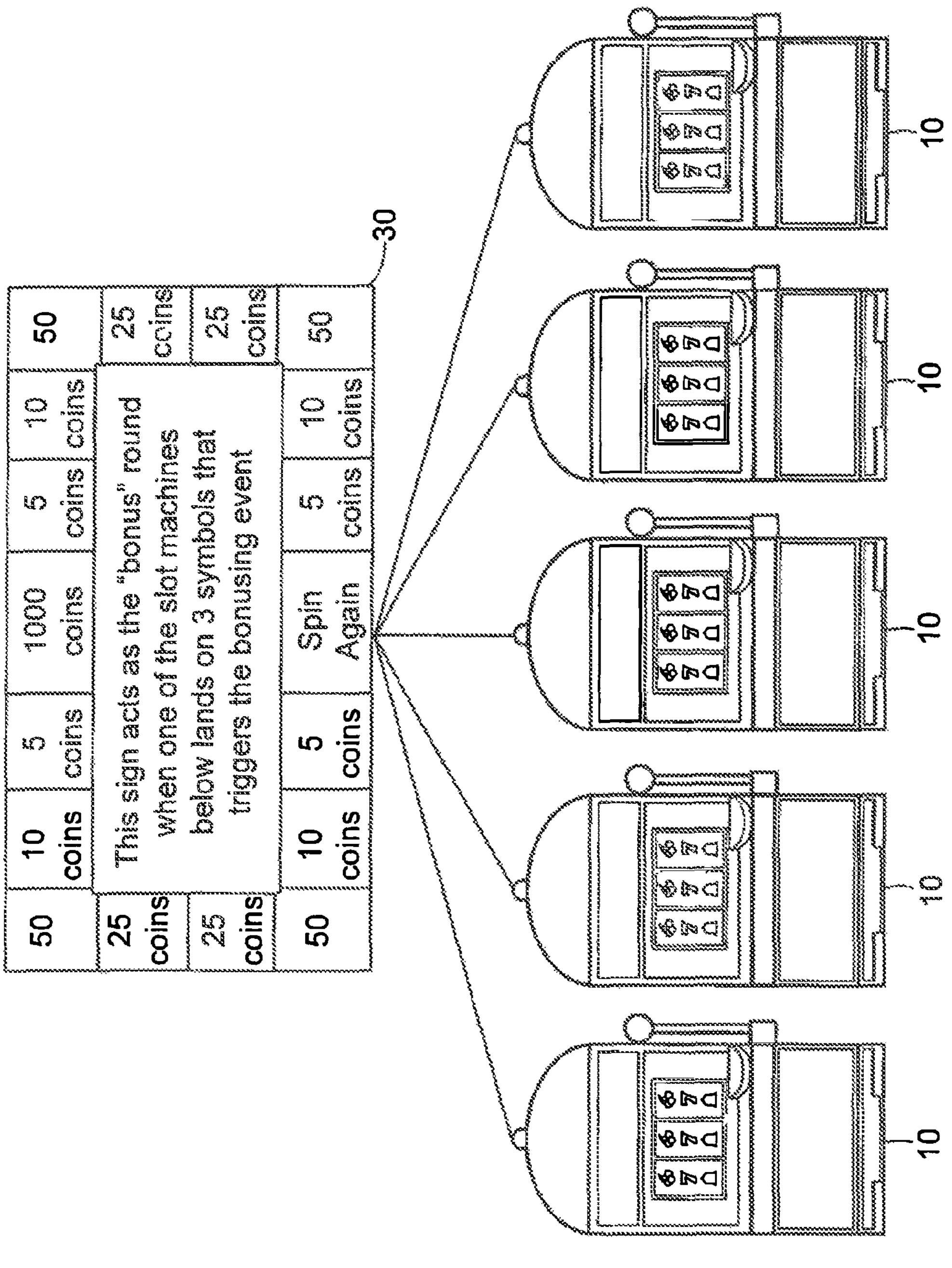
FIG. 2 is an embodiment illustrating a bonusing event of the present invention.

FIG. 2 is an embodiment illustrating linked gaming machines 10 all linked to an interactive sign 30. The user is told either by audio or video through the linked gaming machines that they have entered the bonusing event.

Figure 3:
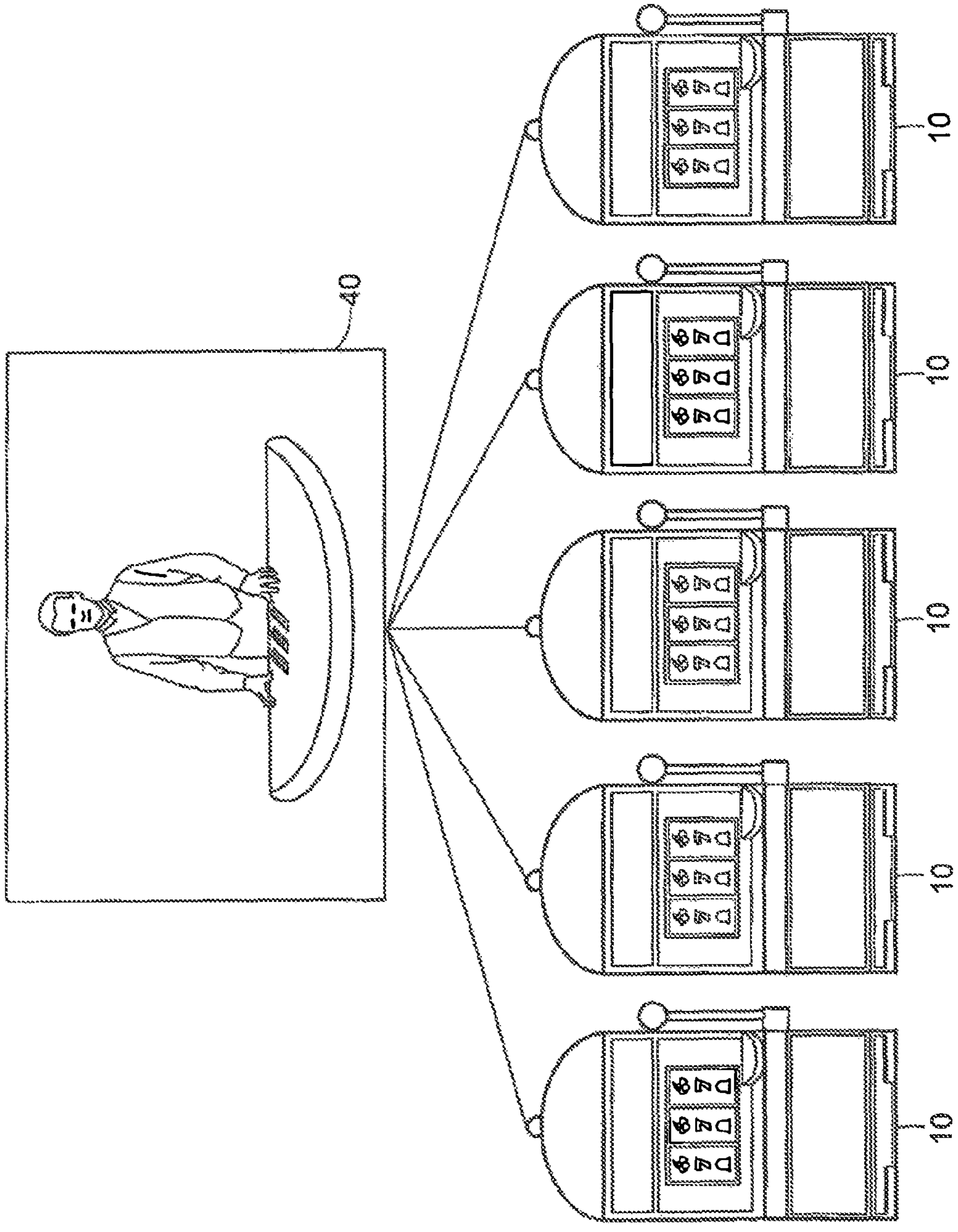
FIG. 3 is an embodiment illustrating a bonusing event of the present invention.

FIG. 3 is an embodiment illustrating linked gaming machines 10 all linked to an interactive sign 40. The interactive sign 40 is an LCD Screen where the player entering the bonusing event plays one on one with the Casino Dealer shown on the interactive sign 40.

Figure 4:
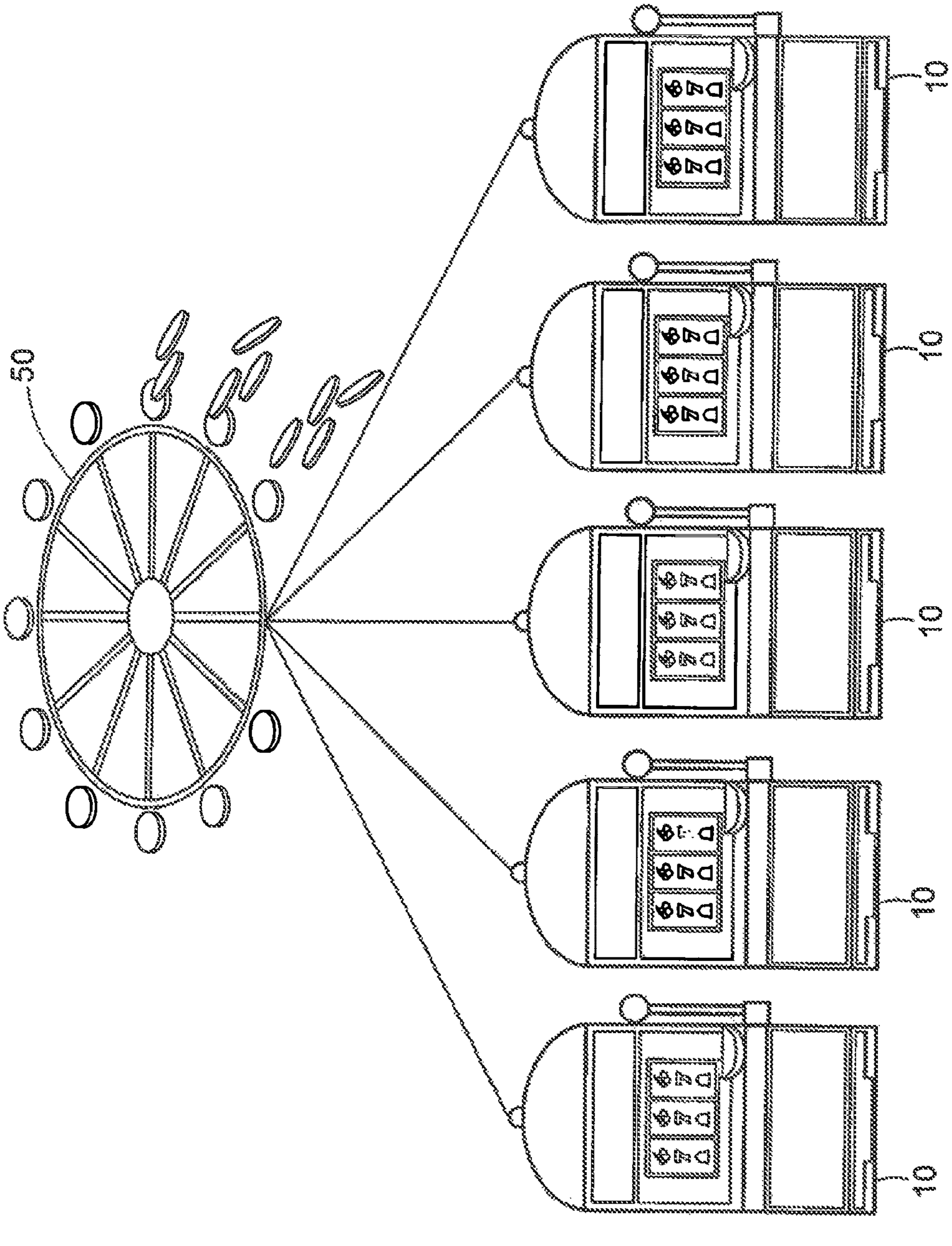
FIG. 4 is an embodiment illustrating a bonusing event of the present invention.

FIG. 4 is an embodiment illustrating linked gaming machines 10 all linked to an interactive sign 50. Interactive sign 50 is a ferris wheel that unloads actual coins when one of the gaming machines 10 below triggers the bonusing event.

In an embodiment, the gaming machines have a video monitor. When a player reaches the bonusing event the video monitor records the player playing the bonusing event on the interactive sign.

In an embodiment, a user places a coin into gaming machine 10. The user then plays the gaming machine 10, for example, a slot machine, video poker machine, video keno machine or video bingo machine. If a user gets a certain response from the gaming machine, such as 3 bonus event symbols, or any other combination of symbols chosen by the operator of the gaming machines, the user is directed to play a bonusing event on an interactive sign. In a preferred embodiment, a user is alerted that they are now playing the bonusing event. The bonusing event is played on an interactive sign as shown in FIGS. 1-4, however other interactive games can also be played on the interactive sign. The user can play the bonusing event on the gaming machine which they were originally playing, or the gaming machine can dispense a card or ticket which allows the user to play a separate machine which is connected to the interactive sign. The interactive sign is linked to at least two gaming machines.

In a further embodiment, the interactive sign can be a game board such as monopoly. Games can be any conventional game which a player plays according to game rules. When a player reaches the game board, they can either play against a computer or play against other persons who have reached the bonusing event through other linked gaming machines. The interactive sign can then roll dice randomly on the screen moving the player around the board. A player can stop at any time adding to their bonus money. However, when a player reaches an obstacle, such as pay taxes, lose a turn, etc., they could lose any part of their bonus earnings.

What is claimed is:

1. A gaming machine system comprising:

a plurality of electronic gaming machines, each being (i) configured to display play of a first game by a player and (ii) configured to be linked to a shared sign, the sign configured to display interactive game play between a player and at least one from the group including: another player, a dealer, and a computer player; and a device connected to the plurality of gaming machines and configured to enable play of a second game displayed on the sign after triggering of a bonusing event by one of the plurality of gaming machines during play of the first game.

2. The gaming machine system of claim 1, wherein the device is configured to play the second game on the sign on behalf of a bonusing event triggering player.

3. The gaming machine system of claim 1, wherein the device is configured to facilitate the play of the second game by a bonusing event triggering player.

4. The gaming machine system of claim 1, further comprising a bonus machine (i) linked to the sign and (ii) configured to facilitate play of the second game on the sign.

5. The gaming machine system of claim 4, wherein upon triggering the bonusing event, the player of the one gaming machine can access the bonus machine for playing the second game on the sign.

6. The gaming machine system of claim 1, further comprising a mechanism for alerting the player of the first game to play the second game on the sign.

7. The gaming machine system of claim 1, wherein the bonusing event is triggered based upon symbols appearing on the one gaming machine.

8. The gaming machine system of claim 1, wherein the bonusing event is triggered based upon an amount of money played on the one gaming machine.

9. The gaming machine system of claim 1, wherein a bonus award won during play of the second game is supplemental to an original award won during play of the first game.

10. The gaming machine system of claim 9, wherein the bonus award is generated from a percentage of money played on the plurality of gaming machines.

11. The gaming machine system of claim 1, wherein the second game includes a depiction of a wheel segmented into monetary denominations.

12. The gaming machine system of claim 1, wherein the second game includes a depiction of a wheel for unloading coins.

13. The gaming machine system of claim 1, wherein the sign is spaced apart from the plurality of gaming machines.

14. The gaming machine system of claim 1, wherein the second game includes a digital Monopoly game.

15. The system of claim 1, wherein the sign includes a video display.

16. The system of claim 15, wherein the video display is a Liquid Crystal Display (LCD).

17. The system of claim 1, further comprising a video capture device to capture video images of a player of one of the plurality of gaming machines during play of the second game, wherein the sign is configured to display the captured video images.

18. A system comprising:

first and second electronic gaming machines configured to be linked to a shared sign, the sign configured to display interactive gameplay between a player and at least one from the group including: another player, a dealer, and a computer player, each machine being configured to display play of a respective first game by a player; and a device connected to the first and second gaming machines and configured to enable play of a bonus game displayed on the sign after triggering of a bonusing event during play of the first games.

19. The system of claim 18, wherein the first gaming machine includes an interface configured to provide the player of the first gaming machine control during play of the second game.

20. The system of claim 18, wherein each of the first games is played independent of the other first games.

21. The system of claim 18, wherein each of the first games is an individual iteration of a same game.

22. A first electronic gaming machine configured for linking with a shared sign, the sign configured to display interactive game play, the first gaming machine comprising:

an interface configured to enable linking between the first gaming machine and one or more other gaming machines, the other gaming machines being linkable to the sign;

wherein the first gaming machine is configured to (i) display play of a first game by a first player and (ii) enable play of a second game displayed on the sign, the second game played between the first player and at least one from the group including another player, a dealer, and a computer player; and wherein the second game occurs after triggering of a bonusing event during play of the first game.

23. A shared sign configured to enable interactive game play, comprising:

an interface configured to enable linking between the sign and at least two electronic gaming machines;

wherein a first of the gaming machines is configured to display play of a first game by a first player, and enable play of a second game displayed on the sign, the second game played between the first player and at least one from the group including: another player, a dealer, and a computer player.

24. The sign of claim 23, wherein the second game occurs after triggering of a bonusing event during play of the first game; and wherein, during the second game, the first player competes against at least one from the group including (i) a computer controlling the sign and (ii) another player playing the second game via a second of the gaming machines.

* * * * *